United States Patent [19]

Umeda

[11] Patent Number: 5,076,605
[45] Date of Patent: Dec. 31, 1991

[54] STABILIZER AND METHOD OF CONTROLLING STABILIZER

[75] Inventor: Hirotaka Umeda, Aichi, Japan

[73] Assignee: TRW Steering & Industrial Products (Japan) Co., Ltd., Kasugai, Japan

[21] Appl. No.: 494,966

[22] Filed: Mar. 16, 1990

[30] Foreign Application Priority Data

Apr. 17, 1989 [JP] Japan .................................. 1-96996

[51] Int. Cl.⁵ .............................................. B60G 11/20
[52] U.S. Cl. .................................... 280/689; 267/277
[58] Field of Search ............... 280/689, 721, 723, 707; 267/273, 277, 154, 191

[56] References Cited

U.S. PATENT DOCUMENTS

| | | | |
|---|---|---|---|
| 4,664,408 | 5/1987 | Saotome et al. | 280/721 |
| 4,805,929 | 2/1989 | Shibata et al. | 280/702 |
| 4,834,419 | 5/1989 | Kozaki et al. | 280/723 |

FOREIGN PATENT DOCUMENTS

| | | | |
|---|---|---|---|
| 2626819 | 8/1989 | France | 267/277 |
| 61-57418 | 3/1986 | Japan | 280/721 |
| 61-64515 | 4/1986 | Japan | 267/273 |
| 2189751 | 11/1987 | United Kingdom | 267/191 |

*Primary Examiner*—Charles A. Marmor
*Assistant Examiner*—Karin Tyson
*Attorney, Agent, or Firm*—Tarolli, Sundheim & Covell

[57] ABSTRACT

In a stabilizer including a middle portion which acts as a torsion bar. One end of the middle portion is supported by a wheel through a vertical stabi-link. A connector is disposed between the middle portion and the wheel. The connector is adapted to regulate the action of the middle portion. The connector includes a housing connected with the stabi-link. A ring is secured with the end of middle portion and rotatably supported in the housing. A recess is formed on the ring. A rod engages with the recess. An actuator acts on the rod. A controller controls the force of the actuator to control the rotatable angle between the end of the middle portion and the stabi-link.

5 Claims, 7 Drawing Sheets

STABILIZER AND METHOD OF CONTROLLING STABILIZER

BACKGROUND OF THE INVENTION

The present invention relates to a stabilizer of a vehicle and method of controlling rolling stiffness of a vehicle by controlling the stabilizer itself.

The stabilizer is combined in the suspension system of a vehicle to increase rolling stiffness of the vehicle, and to increase steering stability of the vehicle when cornering or high speed running.

One example of a known stabilizer is shown in FIG. 7. The central portion 1a of a generally C-shaped bar 1 is formed as a torsion bar, and both end portions 1b are formed as arms. The bar 1 is mounted under a vehicle body (not shown) through mounting portions 2 such that the central portion 1a is rotatable about its own axis. Each of the arms 1b is attached through a stabi-link 3 and a lower arm 4 to a wheel (not shown). Rolling stiffness of the vehicle is improved by connecting the left and right wheels through the torsion bar 1a.

When a vehicle having such a stabilizer runs on a rough road and when one of the wheels heavily bounds from the road surface, or one wheel rides over a projected portion of the road, the other wheel follows the upward motion by the stabilizer thereby impairing, comfortability of the vehicle personel. Especially, with four wheel drive vehicles designed to run on rough roads, such as mountain tracks, this upward stabilizer motion can cause insufficient traction of the wheel.

SUMMARY OF THE INVENTION

Accordingly, the object of the present invention is to provide an improved stabilizer for a vehicle in which the comfortability of vehicle personel is not impaired by decreasing follow-up of the other wheel even when one wheel bounds largely when the vehicle is running on rough roads at relatively low speed, and when one wheel rides on a mound when the vehicle is running straight at high speed.

To achieve the above-mentioned object the stabilizer, according to the present invention, is supported at one end by a wheel. The stabilizer includes a bar or part which acts as a torsion bar. The stabilizer includes a vertical stabi-link and a connecting means positioned between the part and the wheel. The connecting means regulates the action of the part. The connecting means includes a housing connected with the stabi-link. A ring is secured to the part and is rotatably supported in the housing. A recess is formed on the ring. A rod is engaged with the recess. An actuator acts on the rod. A means controls the force of the actuator to control the rotatable angle between the part and the stabi-link.

In another aspect of the invention the stabilizer controls roll rigidity forces in a vehicle. The vehicle has first and second wheels. The first and second wheels are, respectively, attached to first and second arm means. The stabilizer includes a bar means for transmitting force between the first and second arm means. The stabilizer includes a link means for transmitting force between the arm means and an end of the bar means. The stabilizer includes a means for varying the amount of force transmitted by the link means between the first arm means and the end of the bar means. The means for varying includes a ring with a recess. The means for varying includes a rod engaged with the recess. The means for varying includes an actuator for applying force to the rod. The means for varying includes means for controlling the force of the actuator. The ring is rotatable relative to the rod.

By controlling responsibility between left and right wheels in response to vehicle function, according to the present invention, one wheel follows motion of the other wheel when the vehicle steers on flat road. However, straight high speed running on a high-way and at relatively slow speed running on a rough road, at least a portion of the follow-up function of the other wheel is eliminated or delayed so that large motion of one wheel is not directly transmitted to the other wheel ensuring improved smoothness and comfort.

For a fuller understanding of the nature and objects of the present invention, reference should be made to the detailed description taken in conjunction with the accompanying drawings.

DETAILED DESCRIPTION OF THE PREFERRED EMBODIMENTS

Figure 7:
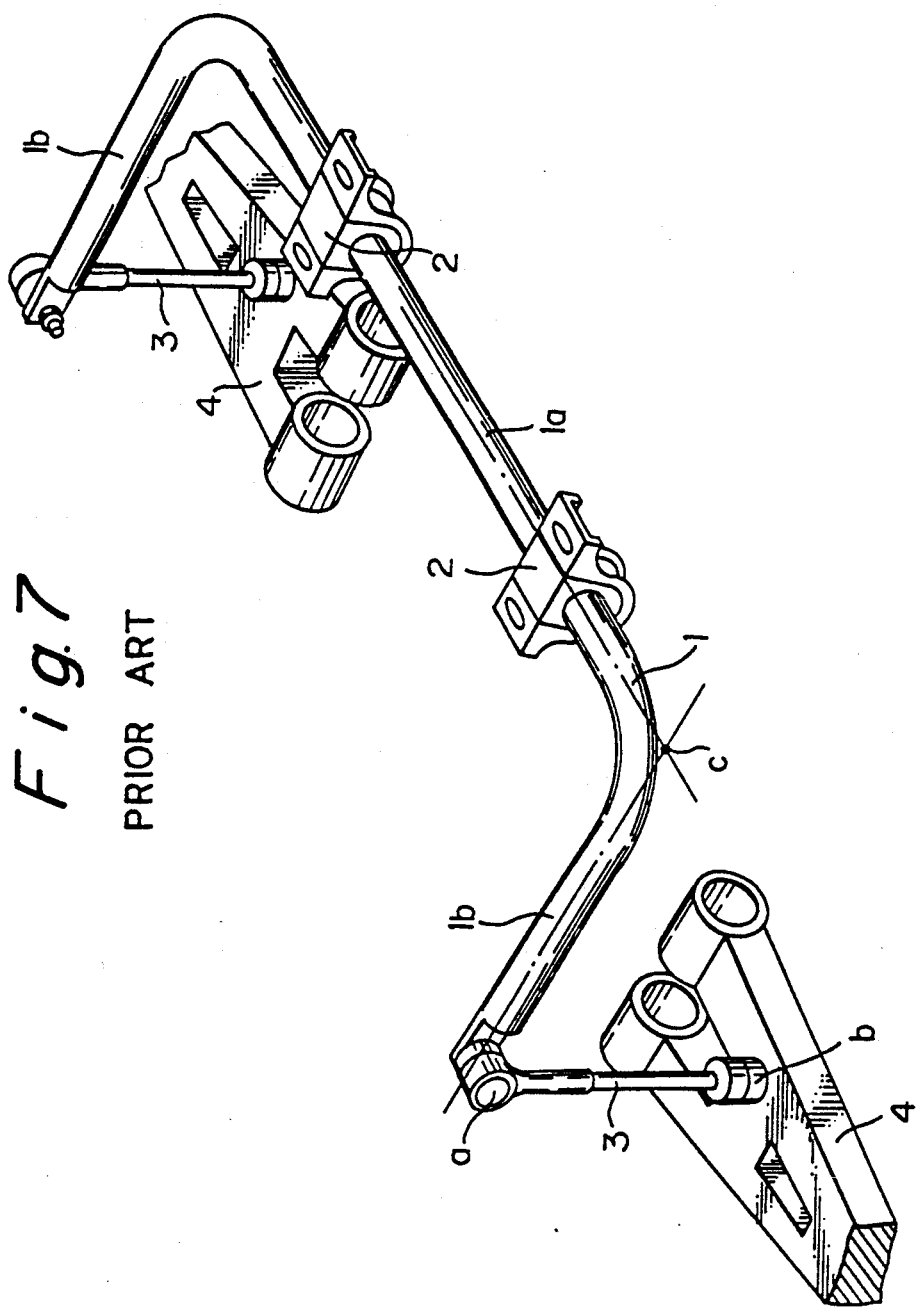
FIG. 7 is a perspective view of a conventional stabilizer.

As shown in the drawings, according to the present invention, the connecting means which is controllable in rotation angle and connecting force is inserted in the known stabilizer shown in FIG. 7 to change responsibility between left and right wheels.

Such inserted elements shown in FIGS. 1 to 5 are as follows:

A: a connecting means which is changeable in rotation angle,

B and C: pivotable rotation joint,

D: a rotation connecting means, and

E: a connecting means which is changeable in pivoting angle.

In all the drawings, the same reference numeral shows the same or similar part or portion for the sake of clarity.

Figure 1:
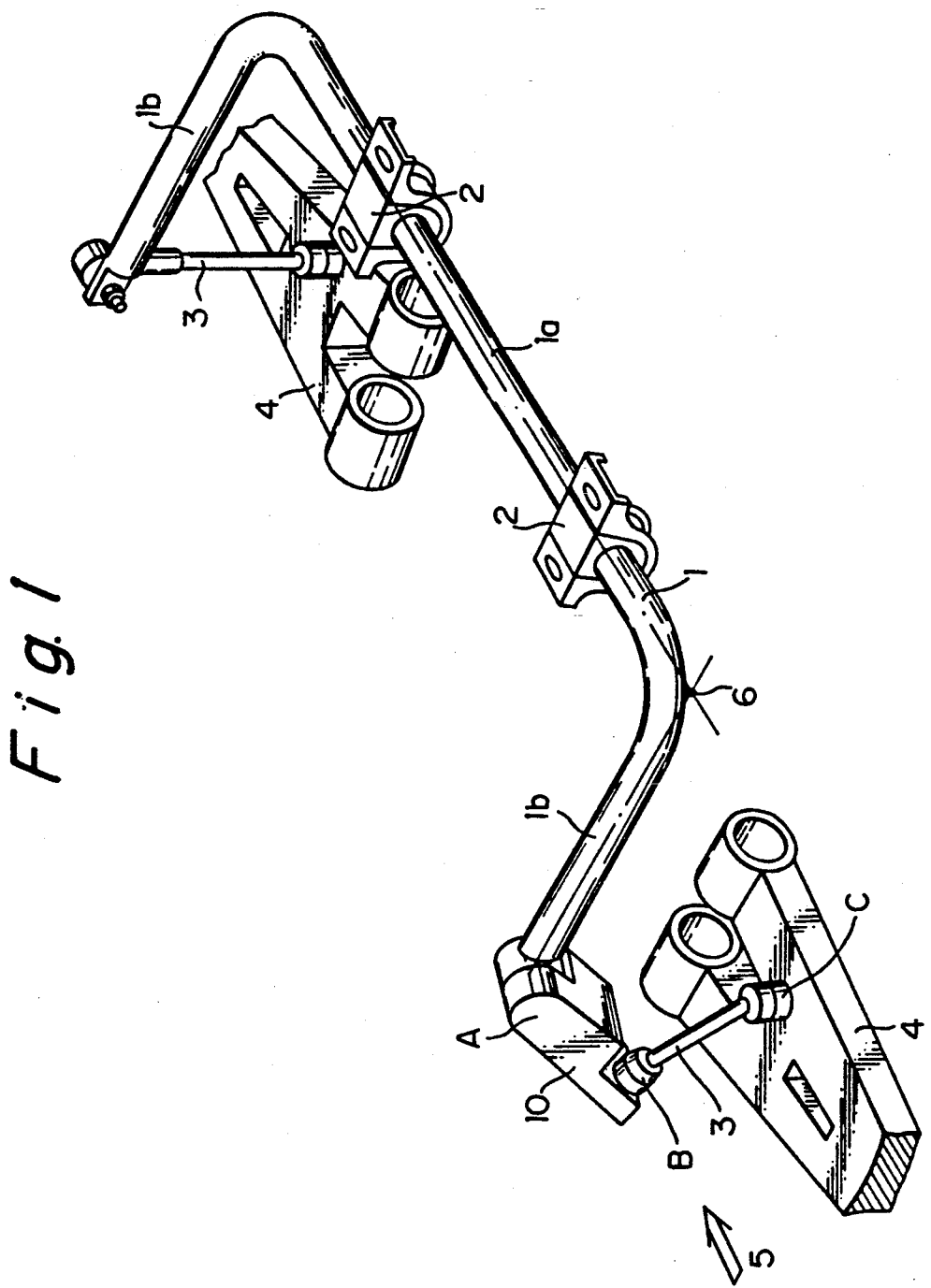
FIG. 1 is a perspective view of a stabilizer, according to one embodiment of the present invention.

Referring to FIG. 1 which shows one embodiment of a stabilizer, according to the present invention, the connecting means A, B and C are used. A link 10 having the connecting means A of link 10 for varying the amount of force transmitted between an arm or end portion 1b of part or bar 1 and the stabilink 3. The bar 1 includes a central portion 1a and arms or end portions 1b. The bar 1 provides a bar means for transmitting force between a pair of lower arms 4. Connecting means B and C are pivotable rotation joints, and are inserted in upper and lower portions of the stabi-link 3. The motion of the links 10 and 3 in the direction of arrow 5 in FIG. 1 is shown in FIGS. 4 and 5, in which FIG. 4 shows the arm 1b inoperative and FIG. 5 shows the arm 1b operative to perform normal stabilizer function.

Figure 4:
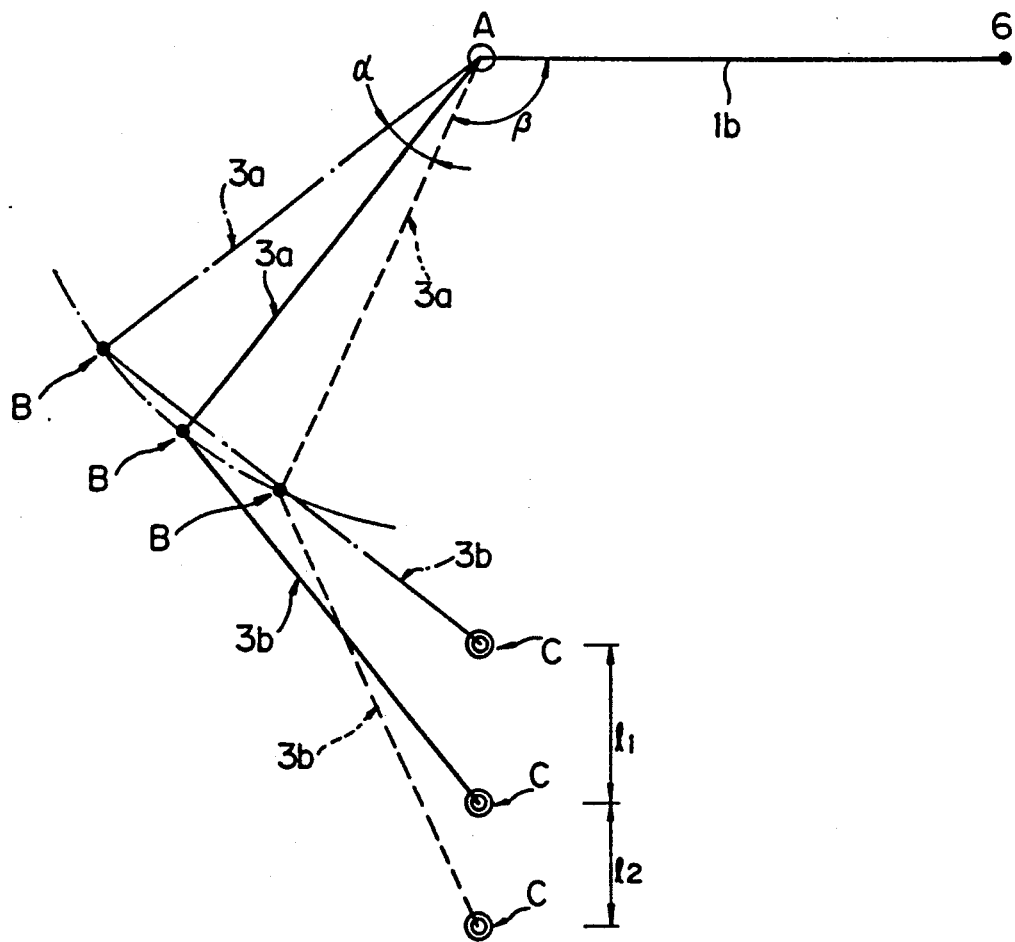
FIGS. 4 and 5 are link mechanisms of the stabilizer shown in FIG. 1.
Figure 5:
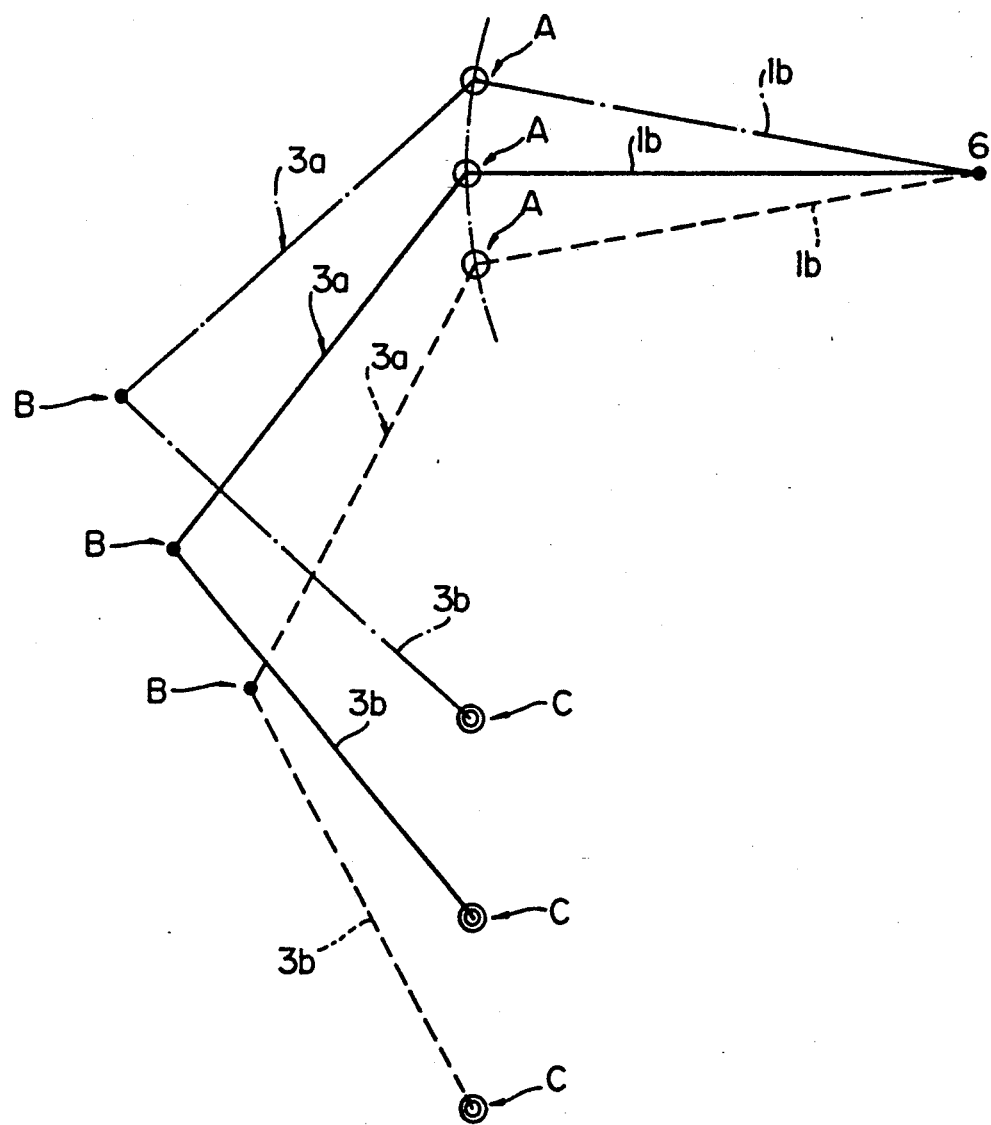

The solid lines in FIGS. 4 and 5 show that both lower arms 4 perform the same motion. When one lower arm 4 moves vertically, the joint C moves vertically in the drawings. As shown in FIG. 5, when the connecting means A of the link 10 is secured, the motion of the joint C is transmitted through the links 10 and 3 to the arm 1b to perform pivoting of the arm 1b as a usual stabilizer.

To impair all or a portion of the function of the stabilizer, the connecting means A of the link 10 is adapted that rotatable angle $\alpha$ is freely rotatable so that as shown in FIG. 4, within a range of the vertical motion of the joint C, angle $\beta$ between the arm 1b of the stabilizer and the link 10 changes. Thus, the arm 1b does not swing about axis 6 and a portion of the function of the stabilizer is impaired.

Consequently, when the connecting force of rotation or pivoting of the link 10 is changeable, the degree of impairment of the function of the stabilizer can be controlled.

In FIG. 4, the range over the angle $\alpha$ and when angle $\alpha=0$, the connection between the link 10 and the arm 1b is rigid as shown in FIG. 5 so that function of the stabilizer is not impaired.

Consequently, by inserting the link 10 and rotation angle $\alpha$ of the connecting means A is controlled, the rolling stiffness of the vehicle is changeable.

Figure 2:
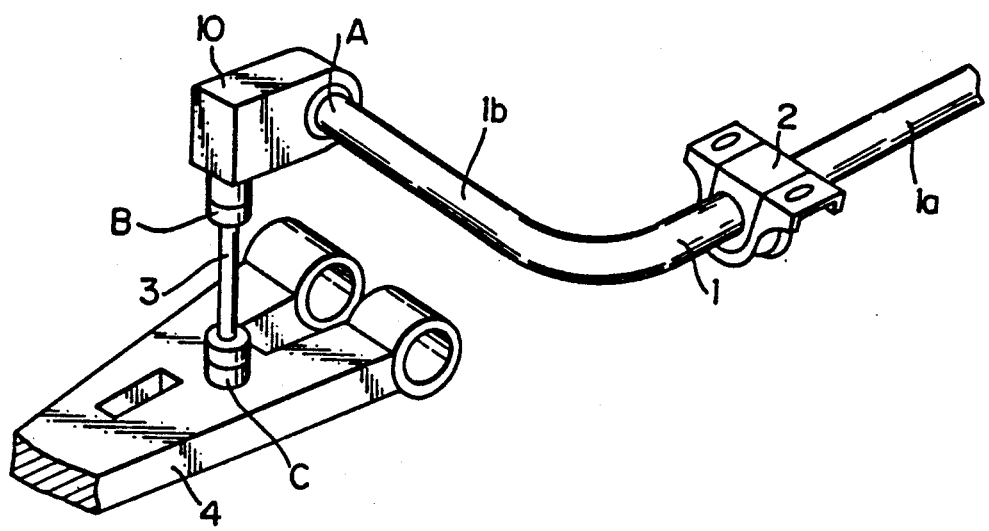
FIGS. 2 and 3 are perspective views of stabilizers, according to other embodiments of the present invention.

The embodiment shown in FIG. 2 shows that the link 10 is connected perpendicular to the arm 1b of the stabilizer 1. As before, by controlling the free rotation angle and connecting force of rotation or pivoting, rolling stiffness of the vehicle can be controlled.

Figure 3:
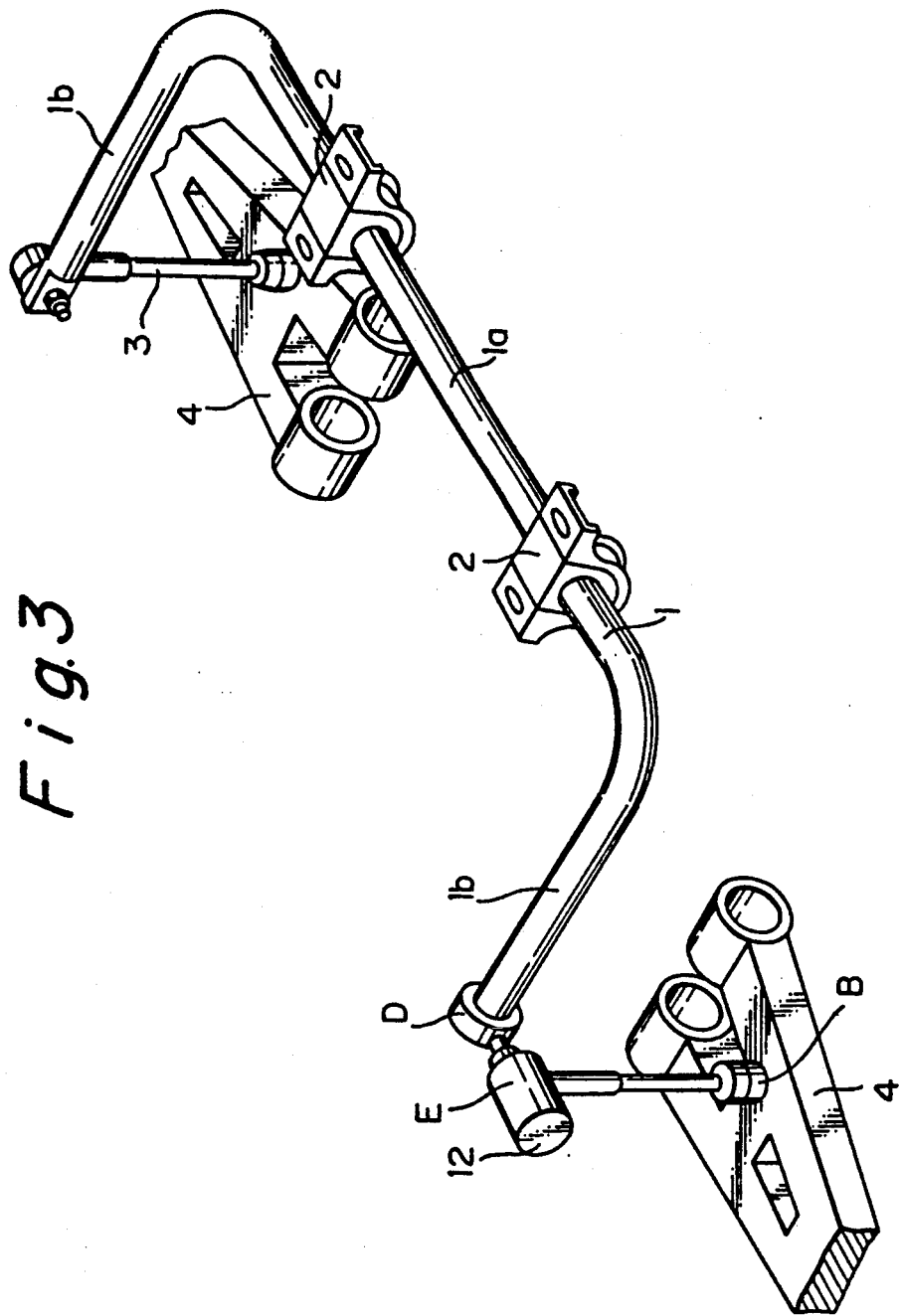

The embodiment shown in FIG. 3 shows that a link 12 having a connecting means E which has a changeable pivoting angle.

Figure 6:
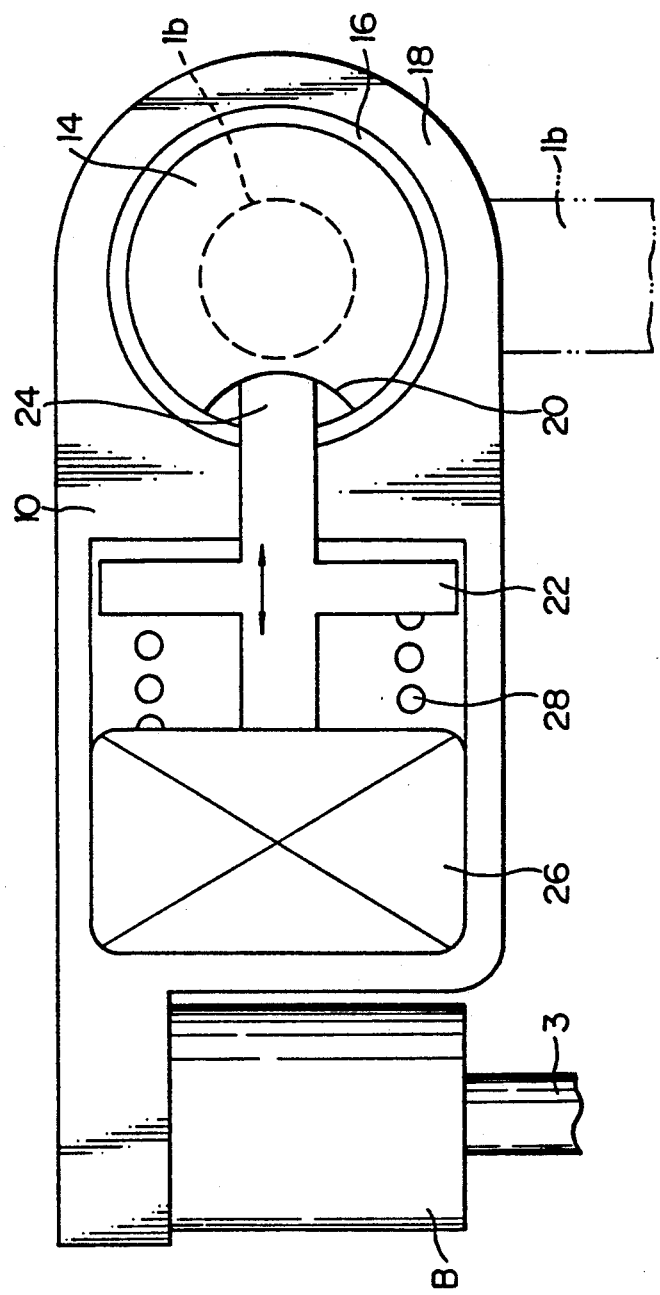
FIG. 6 is an enlarged sectional view of the link of the stabilizer shown in FIG. 1.

FIG. 6 shows one practical embodiment of the link 10 shown in FIGS. 1 and 2, in which the arm 1b is shown as a phantom line in FIG. 1 and as a dotted circle line in FIG. 2. A ring 14 secured with the arm 1b is rotatably supported through a bearing 16 in a casing or housing 18 which is formed in the link 10. The ring 14 forms a recess 20.

In the link 10, a slider 22 is slidably engaged, and an end or rod 24 of the slider 22 contacts or engages with the recess 20. The rear end of the slider 22 engages with a spring 28 to maintain the coupling rigid. An actuator 26 such as a hydraulic device or solenoid applies force to the left shown in FIG. 6 to compensate for the spring force to float the connection between the slider 22 and the ring 14 at an angle. The rear end of the link 10 is connected through the connecting means B with the link 3.

Dimension of the recess 20, strength of the spring 28 and actuating force of the actuator 26 are suitably selected. In the embodiment shown, when the actuator 26 is not applied, rigid connection between the arm 1b and the link 3 can be performed, and when the actuator is applied, free rotation of angle $\alpha$ can be realized. When the applied force of the actuator 26 is variably controlled, more precise control can be performed.

As other embodiment, the spring 26 is applied reverse direction shown in FIG. 6. Or, the spring 26 may be eliminated as desired. In this embodiment, the actuator 26 urges the slider 22 to the recess 20 in operation. Thus, in inoperative condition of the actuator 26, the connection floats at an angle. The control behavior may be changed as desired.

To apply the embodiment shown in FIG. 6 to the embodiment shown in FIG. 3, a sphere is replaced to the ring 14, and spherical recess is replaced to the straight recess 20 to form the connecting means E.

The embodiments shown in the drawing aim to be easily attached to the already present stabilizer. The connecting means to allow a portion of the link mechanism control to be rigid or rotatable, according to the present invention, may be inserted in any portion between the torsion bar 1a and the lower arm 4.

According to the present invention, a portion or all the function of the stabilizer is controllably impaired when the vehicle is running straight at relatively high speed, and when the vehicle is running on rough roads at relatively low speed so that rolling stiffness of the vehicle and comfortability of vehicle personel are greatly improved.

What is claimed is:

1. A stabilizer supported at one end by a wheel, said stabilizer including a part which acts as a torsion bar, a vertical stabi-link, and a connecting means positioned between said part and the wheel for regulating the action of said part, said connecting means comprising a housing connected with said stabi-link, a ring secured to said part and rotatably supported in said housing, a recess formed on said ring, a rod engaged with said recess, an actuator acting on the rod, and means controlling the force of said actuator to control the rotatable angle between said part and said stabi-link.

2. A stabilizer as claimed in claim 1, in which said actuator is housed in said housing.

3. A stabilizer for controlling roll rigidity forces in a vehicle having first and second wheels, the first and second wheels being, respectively, attached to first and second arm means, said stabilizer comprising:
    a bar means for transmitting force between the first and second arm means;
    a link means for transmitting force between the first arm means and an end of said bar means; and
    a means for varying the amount of force transmitted by said link means between the first arm means and said end of said bar means, said means for varying comprising a ring, said ring having a recess, a rod engaged with the recess, an actuator for applying force to said rod, means for controlling the force of said actuator, said ring being rotatable relative to said rod.

4. A stabilizer as set forth in claim 3, wherein said link means is pivotably attached to the first arm, said means for varying including a housing, said link means is rotatably attached to said housing.

5. A stabilizer as set forth in claim 4, wherein said ring is secured to said end of said bar means.

* * * * *